United States Patent
Fang et al.

(10) Patent No.: US 10,169,391 B2
(45) Date of Patent: Jan. 1, 2019

(54) INDEX MANAGEMENT

(71) Applicant: International Business Machines Corporation, Armonk, NY (US)

(72) Inventors: Min Fang, Beijing (CN); Di Jin, Beijing (CN); Zhen Yu Shi, Beijing (CN); Nigel G. Slinger, Los Gatos, CA (US); Shu Wang, Beijing (CN); Li Fei Zheng, Beijing (CN); Wen Jie Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 14/918,876

(22) Filed: Oct. 21, 2015

(65) Prior Publication Data
US 2017/0116246 A1    Apr. 27, 2017

(51) Int. Cl.
G06F 17/00    (2006.01)
G06F 17/30    (2006.01)

(52) U.S. Cl.
CPC .. G06F 17/30348 (2013.01); G06F 17/30336 (2013.01)

(58) Field of Classification Search
None
See application file for complete search history.

(56) References Cited

U.S. PATENT DOCUMENTS

| | | | | |
|---|---|---|---|---|
| 5,377,329 | A * | 12/1994 | Seitz | G06F 15/17 708/1 |
| 5,738,356 | A * | 4/1998 | Marshall | F01D 25/186 277/313 |
| 6,405,292 | B1 * | 6/2002 | Joseph | G06F 12/0806 711/131 |
| 2003/0149748 | A1 * | 8/2003 | Duisenberg | H04L 47/13 709/219 |
| 2004/0028042 | A1 * | 2/2004 | Srinivasan | G11B 27/28 370/392 |
| 2005/0010744 | A1 * | 1/2005 | Filippo | G06F 9/30043 712/225 |
| 2005/0259960 | A1 * | 11/2005 | Wan | G11B 27/034 386/329 |
| 2013/0016615 | A1 * | 1/2013 | Shi | H04W 72/1284 370/241 |
| 2013/0195424 | A1 * | 8/2013 | Ohashi | H04N 21/4332 386/241 |
| 2014/0201384 | A1 * | 7/2014 | Rhea | H04L 65/605 709/231 |

(Continued)

*Primary Examiner* — Hung D Le
(74) *Attorney, Agent, or Firm* — Stephanie L. Carusillo

(57) ABSTRACT

As disclosed herein a method, executed by a computer, includes storing, by one or more processors, entries associated with an index to a first buffer of at least two buffers allocated to the index, and moving, by a batch operation, by one or more processors, entries in the first buffer into an index page for the index in response to an entry movement condition being met. The method further includes storing, by one or more processors, new entries associated with the index to another buffer of the at least two buffers while moving the entries in the first buffer. A computer program product corresponding to the above method is also disclosed herein. A computer program product and computer system corresponding to the above method are also disclosed herein.

20 Claims, 3 Drawing Sheets

(56) References Cited

U.S. PATENT DOCUMENTS

| | | | |
|---|---|---|---|
| 2014/0281417 A1* | 9/2014 | Peters | G06F 9/3004 712/220 |
| 2014/0289470 A1* | 9/2014 | Thomas | G06F 12/128 711/122 |
| 2014/0344236 A1* | 11/2014 | Xiao | G06F 17/30368 707/696 |
| 2015/0074373 A1* | 3/2015 | Sperber | G06F 9/30145 712/7 |
| 2015/0145880 A1* | 5/2015 | Smith | G06T 1/60 345/557 |
| 2015/0169452 A1* | 6/2015 | Persson | G06F 12/0808 711/135 |
| 2015/0189365 A1* | 7/2015 | Xing | H04N 21/4343 725/88 |
| 2016/0012856 A1* | 1/2016 | Cave, Jr. | G11B 27/005 386/241 |

\* cited by examiner

INDEX MANAGEMENT

BACKGROUND

The present disclosure relates to index management within a database management system, and more particularly to index management within a database management system when performing sequential database record inserts.

A Database Management System (DBMS) is an application for manipulating and managing the database centrally, which is used to establish, use, and maintain the database so as to ensure the safety and integrity of the database. A database index is a data structure that improves the speed of data retrieval operations on a database table at the cost of additional write operations and storage consumption to maintain the index data structure. Indices can be used to quickly locate data without having to search every row in a database table every time the database table is accessed. The indices can be created using one or more columns of a database table, thereby providing a basis for both rapid random lookups and efficient access of ordered records.

SUMMARY

As disclosed herein a method, executed by a computer, includes storing, by one or more processors, entries associated with an index to a first buffer of at least two buffers allocated to the index, and moving, by a batch operation, by one or more processors, entries in the first buffer into an index page for the index in response to an entry movement condition being met. The method further includes storing, by one or more processors, new entries associated with the index to another buffer of the at least two buffers while moving the entries in the first buffer. A computer program product corresponding to the above method is also disclosed herein. A computer program product and computer system corresponding to the above method are also disclosed herein.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and to completely conveying the scope of the present disclosure to those skilled in the art.

Figure 1:
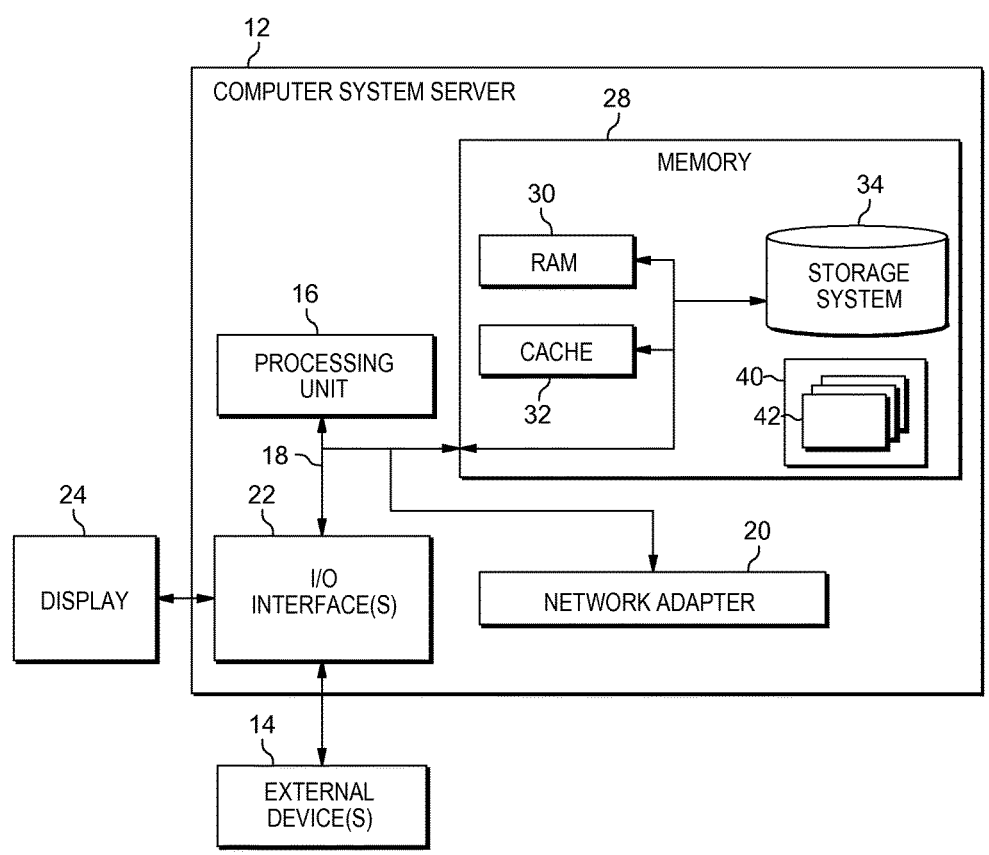
FIG. 1 schematically illustrates a block diagram of an exemplary computer system which is applicable to implement embodiments of the present disclosure.

Referring now to FIG. 1, in which an exemplary computer system/server 12, which is applicable to implement the embodiments of the present disclosure, is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carries out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, data archival storage systems, etc.

Next, detailed description will be made to the solution as provided in the present disclosure with reference to embodiments of the present disclosure. As mentioned hereinabove, the database index is usually used in a DBMS to manage the DBMS. In a major DBMS application model, data are usually sequentially inserted into tables. When new data is inserted into a table, all indices on this table shall be updated with the new key entry so that all key entries are kept sequentially. However, the sequential data insertion might cause a problem, i.e., hot leaf pages, especially when an application generates keys of index in a given order, since in such a case, every entry insertion tries to fit into the last index leaf page. When there is no more space in a leaf page for new entries, the DBMS has to enlarge the index tree structure through splitting the leaf page so as to hold the new entries, which might involve a lot of operations. Generally, for a leaf page split operation, it requires to lock the whole index b-tree structure, synchronize I/O read in a new page, format the new page as an index leaf page, maintain the page chain and spacemap page, and move some index key entries from the old page into the new page. In addition, in some DBMS, it also triggers logs to be written into a Direct Access Storage Device (DASD). During enlarging the index b-tree structure, an application using the database has to wait for the DBMS to complete the index structure change before it can inserting any new keys. Thus, the frequent index page splits will elongate the waiting time of the application greatly, which brings bad experience to users.

According to an embodiment of the present disclosure, at least two buffers will be allocated to an index. All entries associated with an index can be stored into a first buffer of the at least two buffers. In response to an entry movement condition being met, entries stored in the first buffer will be moved to an index page and at the same time new entries associated with the index will be stored into another buffer. Thus, in embodiments of the present disclosure, before inserting into an index page, entries associated with an index are buffered in a corresponding buffer and when entries stored in the buffer need to be moved to the index page, another buffer allocated to the index will be used to store new entries. In such a way, the entries can be moved to the index page in a batch operation and at the same time it will not bring any time delay to the application. Hereinafter, reference will be made to FIGS. 2 to 5 to describe the solution as provided herein in detail in conjunction with some example embodiments.

Figure 2:
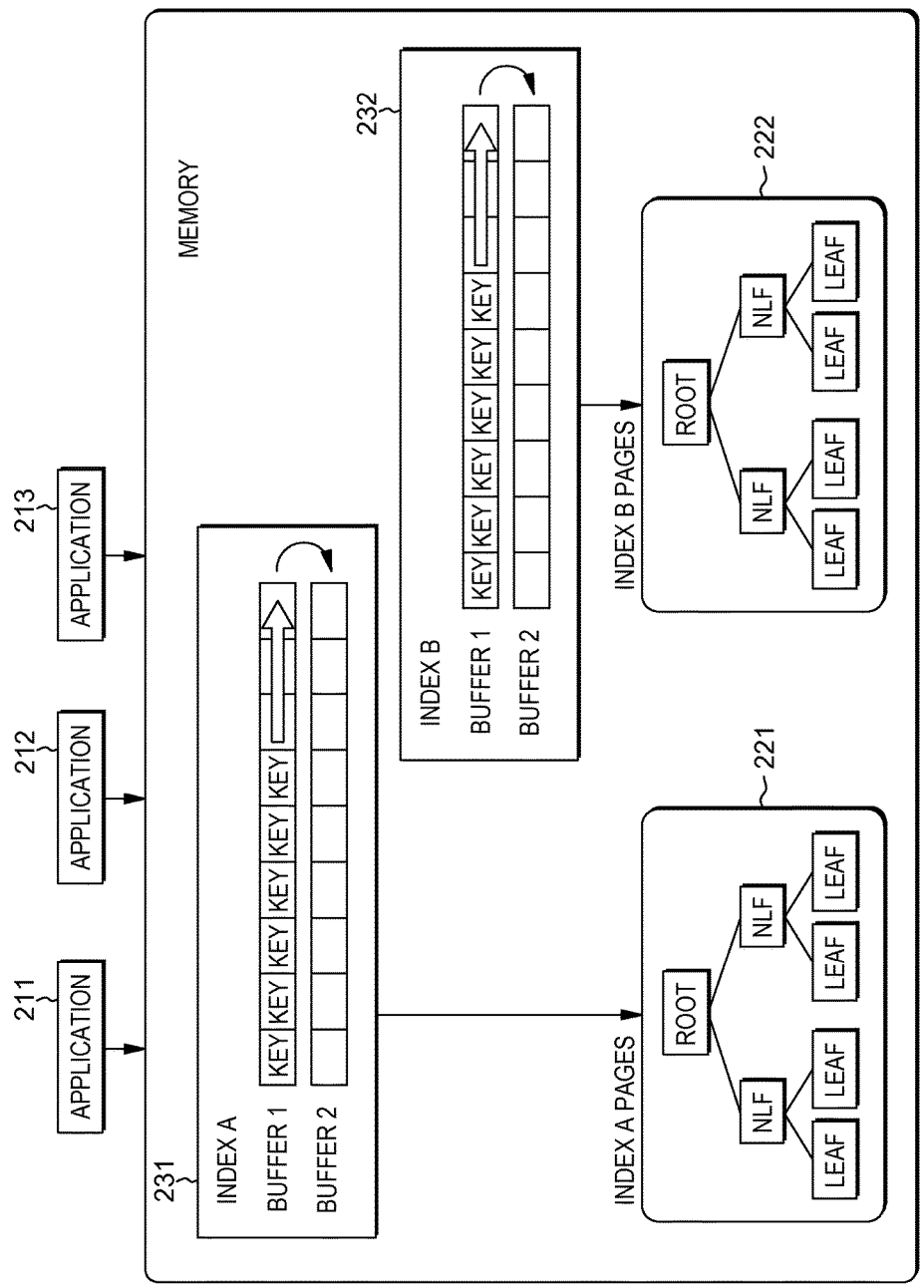
FIG. 2 schematically illustrates a block diagram of a system architecture for index management in accordance with an embodiment of the present disclosure.

FIG. 2 schematically illustrates a block diagram of system architecture for index management in accordance with an embodiment of the present disclosure. As illustrated in FIG. 2, there are three example applications 211, 212 and 213 which access the database. The application may for example, insert an entry into a table in the database, query, update, or delete entries stored in the database, and so on. In the memory, there are index pages 221 for index A and pages 222 for index B. Each of index pages 221 and 222 has a tree structure which comprises a root node (ROOT), non-leaf node (NLF), and leaf node (LEAF). Buffer area 231 is allocated for storing entries corresponding to index A, and buffer area 232 is allocated for storing entries corresponding to index B. For each of index A and index B, the number of buffers within buffer areas 231, 232 can be two or more. In FIG. 2, only for a purpose of illustration, there are illustrated two buffers for each of index A and index B, i.e., buffer 1 and buffer 2. Entries associated with index A from all the applications 211 to 213 will be stored in the buffers first (e.g., buffers 1 and 2 of buffer area 231); if buffer 1 is full, or some other entry movement condition is met, entries stored in buffer 1 will be moved from the buffer 1 to the index A pages 221. At the same time, new entry insertions corresponding to index A will be switched from buffer 1 to buffer 2. In other words, when moving entries stored in buffer 1 to index A pages, new entries will be stored in buffer 2. Similarly, when the entry movement condition is later met for buffer 2, the entry insertion will be switched back to buffer 1. For the buffers 1 and 2 corresponding to buffer area 232 and index B, similar operations will be performed. Therefore, in an embodiment of the present disclosure, the entries can be moved to the index page in a batch operation without causing the application to experience any additional delay.

It should be noted that although two indices are illustrated in FIG. 2, in a real implementation there may be a large number of indices. Additionally, the number of applications accessing the database may be more or less than three, and the number of buffers for one index may be more than two.

Figure 3:
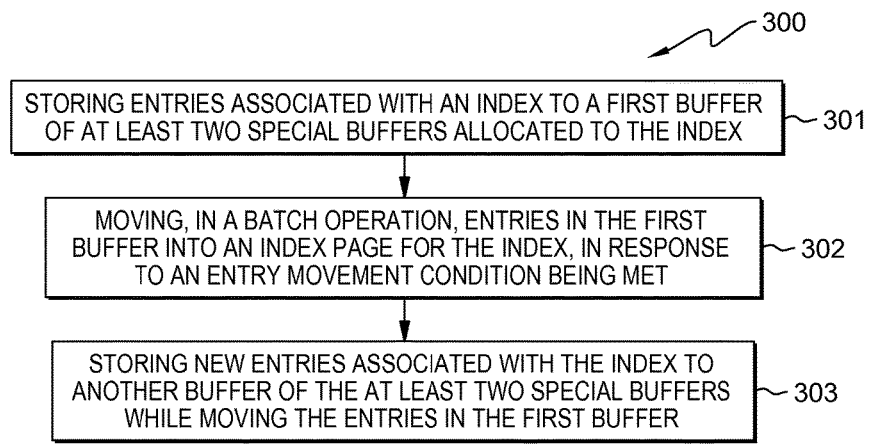
FIG. 3 schematically illustrates a flow chart of a method of index management in accordance with an embodiment of the present disclosure.

FIG. 3 illustrates a flow chart of a method of index management in accordance with an embodiment of the present disclosure and hereinafter, reference will be made to FIG. 3 to describe the method of index management as provided in the present disclosure in more detail.

As illustrated in FIG. 3, the method 300 starts from step 301, in which entries associated with an index are stored in one of at least two storage buffers allocated to the index. As mentioned hereinabove, for an index, at least two buffers will be allocated thereto, for the purpose of storing index entries corresponding to the index. Each index entry is a key/rid pair which comprises an index key and a row id indicating a record in a related table. The index that an entry is associated with can be easily identified based on the index key of an entry. Therefore, when an entry is to be inserted, the index can easily be determined. In turn, the entry can be stored into the buffer allocated to the index, instead of being inserted into index pages directly.

In one embodiment of the present disclosure, a buffer may have a predetermined size, which may be determined based on application requirements. In addition, each of the buffers may include a predetermined number of slots. Each slot is used to store only one entry. Therefore, the number of slots may be determined by the size of the buffer and the total length of an entry, and typically may be obtained by dividing the size of the buffer by the total length of an entry. In such a way, all the slots in the same buffer have the same size since the total length of an entry is a fixed value. This could facilitate storing and querying of the data in the buffer since it can use an offset to perform the data storage and query conveniently.

Before an entry is written to the buffer, a write position (slot) must be identified. In an embodiment of the present disclosure, each buffer has a slot indication field (e.g., "CURRENT_SLOT") which is used to indicate the position of the last-inserted slot in the buffer. In other embodiments of the present disclosure, each buffer has a slot indication field (e.g., "CURRENT_SLOT") which is used to indicate the position of the next available slot. When an entry is to be inserted, the next sequential slot may be allocated to the entry.

Figure 4:
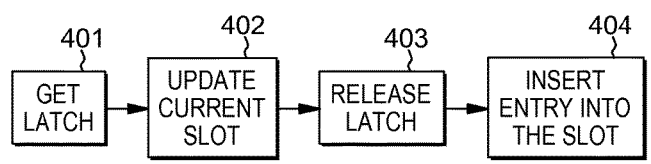
FIG. 4 schematically illustrates a diagram of slot assignment in accordance with an embodiment of the present disclosure.

The assignment of slots may be performed serially to ensure correct slot assignment. Particularly, a latch-like technology can be used. For a purpose of illustration, FIG. 4 illustrates a diagram of slot assignment in accordance with an embodiment of the present disclosure. As illustrated in FIG. 4, before assigning a slot, a latch is first obtained in step 401, so that no other slot assignment can be performed at the same time. This means that only one slot can be assigned at a time. Then, in step 402, the slot next to the current slot, as indicated by the "CURRENT_SLOT", will be assigned to an entry and the value in the "CURRENT SLOT" field will be updated accordingly. Then the latch is released in step 403 and the entry can be inserted into the assigned slot 404. Thus, when there are multiple insertions, the slots will be allocated to the entries one by one.

Figure 5:
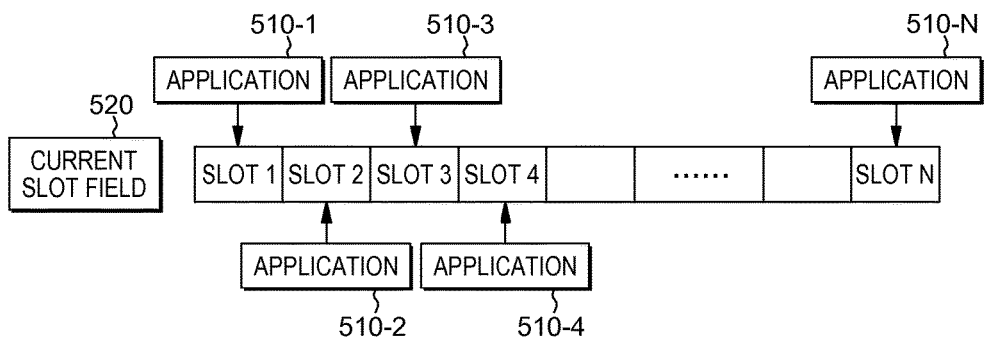
FIG. 5 schematically illustrates a diagram of concurrent data insertions in accordance with an embodiment of the present disclosure.

In addition, in response to an occurrence of multiple insertions from different applications, entries will be written to their assigned slots and stored in parallel, which does not require any of the entry insertions to wait for other insertions. Therefore, for parallel multiple insertions, slots will be allocated serially but the multiple insertions can be performed in parallel since each of the multiple insertions, per se, are independent from each other. FIG. 5 schematically illustrates a diagram of concurrent data insertion in accordance with an embodiment of the present disclosure. As illustrated in FIG. 5, various applications (e.g., applications 510-1, 510-2, 510-3, 510-4, through 510-N) have been assigned respective slots and thus they can store their entries concurrently since these entry insertions are independent operations and will not affect with any other entry insertion. The next slot to be assigned may be determined by referencing current slot field 520. Concurrent data insertion enables improved efficiency of index management.

Referring back to FIG. 3, in step 302, in response to an entry movement condition being met, entries stored in a first buffer of the at least two buffers are moved into an index page for the index. The entry movement condition used herein means a condition that triggers an entry movement operation which move entries stored in a buffer into an index page. One example of the entry movement condition is that the buffer is full. As described hereinbefore, each buffer has a fixed size and when the buffer is full, there is no further room for entries in the buffer and thus the entries can be moved to an index page to make room for other entries. Other examples that may cause the entry movement condition may be a concurrent query, delete, or update operation of an entry stored in a buffer. Herein "a concurrent query, delete, or update operation" means a query, delete, or update operation occurring at the same time index entries are being written to the buffers. Entries stored in the buffer cannot be accessed by the query, delete, or update operation. If entries are still stored in the buffer, the query, delete, or update operation may produce an inaccurate result and cause some operation errors. Hence, the entries stored in the buffer shall be moved to the index page so as to ensure that these operations can be performed correctly and successfully.

Therefore, in response to the entry movement condition being met, the entries stored in the first buffer can be offloaded into the index page in a batch operation. The offloading of the buffer can be performed by using an existing index update method, which is known in the art and thus is not elaborated herein.

At the same time, in step 303, while moving the entries in the first buffer into the index page, new entries associated with the index will be stored to another buffer of the at least two buffers allocated to the index. That is to say, while moving the entries in the first buffer into the index page, the data storing is not interrupted but is performed at the same time by using another buffer.

Even though the batch offloading may cause one or more index leaf pages to split, the operation of splitting an index leaf page is independent of the new entry storing. This means, if there is a leaf page split during moving entries, the leaf page split might affect the operation of moving entries into the index page but will not affect the new entry storing at all, which thus does not requires to the application to wait. In such a way, system efficiency can be improved greatly and the user can have a better experience.

It should be understood that the method as described hereinabove can be performed for the sequential data storing in which index keys are inserted into index pages sequentially or a random data storing in which index keys are inserted into index pages randomly; however, the sequential data storing can benefit much more from the method. Thus, in one embodiment of the present disclosure, a sequential data insertion detection is performed. If a sequential data insertion is detected, the operations of storing entries, moving entries, and storing new entries are enabled for all indices (herein after, the method) and thus the system can benefit therefrom. On the other hand, in response to a detection of a random data insertion, the method may be disabled. In a case of disabling the method, offloading of the buffers may be first triggered, and after the buffers have been offloaded (e.g., emptied), the buffers can be de-allocated. The sequential data insertion detection can be performed, for example, by monitoring the data insertion for a predetermined time interval and determining the data insertion mode based on the monitored results. For example, if an index page is accessed continuously or data is continuously inserted into one index page, it can be determined that a sequential data insertion is detected; otherwise, it is a random data insertion. There are existing algorithms in the art to detect whether pages are being assessed sequentially. For example, DB2® for z/OS sequential detection algorithm may be used to detect the data insertion mode.

When the offloading of buffers occurs frequently for a specific index, the benefit from the method might be decreased substantially, and disabling the method for the specific index may be considered. For example, if a frequency of concurrent query, delete and/or update of entries stored in a buffer allocated to the specific index reaches a predetermined frequency threshold, it means that the offloading buffers for the index is triggered too frequently. Thus, the method can be disabled for the specific index. Particularly, the offloading of the buffers for the index can be triggered and the buffers for the index can be de-allocated. If the frequency of concurrent query, delete, and/or update of entries stored in a buffer allocated to the specific index does not reach a predetermined frequency threshold, then the method will continue for the specific index. That is to say, the method can be disabled for the specific index and at the same time, the method can be still operational for other indices.

In addition, in a DB2® data sharing environment, each DB2® member sharing the DB2® data will have its own buffers for respective indices for storing entries. In other words, buffers will be allocated to the indices for each DB2® member. Thus, when entries stored in buffers are moved or offloaded to the index pages, concurrent data updating may occur between different DB2® members. In such a case, an existing index latch technology, such as the latch algorithm in DB2®, can be used to synchronize index updates among different DB2® members. The index latch technology is known in the art and thus will not be described herein.

In one embodiment of the present disclosure, when a rollback happens, a pseudo deletion flag is set instead of deleting an inserted key. Usually when the rollback happens, a key inserted previously may be deleted. However a delete operation involves many processes, for example deleting the entry, updating other entries and etc. Thus, in the embodiment of the present disclosure, for a rollback related to an entry in an index page, a flag "RID_pseudo_delete_flag" is set as "YES" in the buffer, which indicates this key value is deleted. On the other hand, for a rollback related to an entry in a buffer, an entry with "RID_pseudo_delete_flag=YES" is written into the buffer. Therefore, during offloading entries stored in the buffer, the offloading processing will update the corresponding entry in the index page with RID_pseudo_delete_flag=YES automatically, which means the corresponding entry will be deleted.

Further, logs can be recorded in response to a database operation occurring in the buffers or entries being moved from the buffer to the index page. Particularly, an entry operation log may be recorded in response to an entry operation such as insertion, deletion, or the like occurring in the at least two buffers. For example, an entry insertion log can be written in response to an entry being stored into a buffer and the entry insertion log may include the index/key information and information on a page number (with the page number=buffer); an entry deletion log can be written in response to an entry being deleted from a buffer and similarly the entry deletion log may include the index/key information and information on a page number (with the page number=buffer). Besides, logs can also be written in response to entries being moved from the buffer to the index page. Particularly, a buffer externalization log can be recorded in response to entries being moved from a buffer into an index page; and a page writing log can be recorded in response to entries being moved to an index page successfully. In such a way, it is possible to provide the operations logs for fault data recovery.

In the present disclosure, there is further provided a computer system for index management. The system may comprise one or more processors; one or more computer readable storage media; program instructions stored on the computer readable storage media for execution by at least one of the one or more processors. The program instructions comprises: program instructions to store entries associated with an index to a first buffer of at least two buffers allocated to the index; program instructions to move entries in the first buffer into an index page for the index in a batch operation when an entry movement condition is met; and program instructions to store new entries associated with the index to another buffer of the at least two buffers while moving the entries in the first buffer.

In an embodiment of the present disclosure, the at least two buffers each may contain a given number of slots for storing entries, which is determined based on the size of the at least two buffers and a total length of an entry.

In another embodiment of the present disclosure, an entry associated with the index may be stored to a slot assigned to the entry and wherein a field is used to indicate a position of a last-inserted slot during assigning a slot.

In a further embodiment of the present disclosure, multiple slots can be assigned to multiple entries to be stored and the multiple entries can be concurrently stored into the multiple slots respectively.

In a still further embodiment of the present disclosure, the computer system can be enabled for all indices in response to a sequential insertion being detected and be disabled for all indices in response to a random data insertion being detected.

In another embodiment of the present disclosure, the method can be disabled for a specific index in response to a frequency of concurrent querying, deleting and/or updating of entries stored in the buffer reaching a predetermined frequency threshold. However, the method may continue operation if the predetermined frequency threshold is not reached.

In a further embodiment of the present disclosure, the program instructions can further comprise program instructions to record operation logs. Particularly, the program instructions can further comprise any one or more of program instructions to record an entry operation log in response to an entry operation occurring in any of the at least two buffers; program instructions to record a buffer externalization log in response to entries being moved from any of the at least two buffers into an index page; or program instructions to record a page writing log in response to entries being moved to an index page successfully.

In another embodiment of the present disclosure, meeting the entry movement condition comprises one or more of: (i) the buffer is full; (ii) a concurrent query operation of an entry stored in the first buffer is required; (iii) a concurrent updating operation of an entry stored in the first buffer is required; or (iv) a concurrent deletion operation of an entry stored in the first buffer is required.

For a purpose of simplification, detailed description of operations of the system will not be elaborated herein, and for details of these operations, one may refer to description with reference to FIGS. 2 to 5.

Furthermore, there is also provided a computer program product comprising a machine-readable medium having program instructions embodied therewith, the program instructions executable by a device to cause a device to perform the method as described hereinbefore. Similarly, for a purpose of simplification, detailed description of steps of the method will not be elaborated herein, and for details, one may also make reference to description with reference to FIGS. 2 to 5.

Hereinbefore, specific embodiments of the present disclosure have been described; however, it shall to be understood that these embodiments are presented only for illustration purposes and the present disclosure is not limited thereto. For example, the method can be performed only for hot indices instead of all indices; the offloading of entries stored in a buffer can be triggered by any other suitable entry movement condition in addition to those given hereinabove; and the buffer may have a structure different from slots.

It is to be understood that the method as described in the present disclosure can also be implemented by corresponding modules, which are implemented by various manners, including software, hardware, firmware or a random combination thereof. For example, in some embodiments, one or more modules can be implemented by software and/or firmware. Alternatively or additionally, the system described herein above can also be implemented partially or completely based on hardware. For example, one or more of these modules can be implemented as an integrated circuit (IC) chip, an application-specific integrated circuit (ASIC), a system on chip (SOC), a field programmable gate array (FPGA), and the like.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products in accordance with embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products in accordance with various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of index management, comprising:
storing, by one or more processors, entries associated with an index to a first buffer of at least two buffers allocated to the index;
moving, by a batch operation, by one or more processors, entries in the first buffer into an index page for the index in response to an entry movement condition being met; and
storing, by one or more processors, new entries associated with the index to another buffer of the at least two buffers while moving the entries in the first buffer.

2. The method of claim 1, wherein the at least two buffers each contain a given number of slots for storing entries, which is determined based on a size of the at least two buffers and a total length of an entry.

3. The method of claim 1, wherein an entry associated with the index is stored in a slot assigned to the entry and wherein a slot indication field is used to indicate a position of a last-inserted slot.

4. The method of claim 1, wherein operations of storing entries, moving entries, and storing new entries are enabled for all indices in response to detection of sequential data insertion and disabled for all indices in response to detection of random data insertion.

5. The method of claim 1, further comprising monitoring a frequency of one or more of concurrent query, delete, and update operations associated with the index and disabling operations of storing entries, moving entries, and storing new entries while a frequency is less than a predetermined frequency threshold.

6. The method of claim 1, further comprising one or more of:
recording, by one or more processors, an entry operation log in response to an entry operation occurring in any of the at least two buffers;
recording, by one or more processors, a buffer externalization log in response to the entries being moved from any of the at least two buffers into the index page; and
recording, by one or more processors, a page writing log in response to entries stored in any of the at least two buffers being moved to the index page successfully.

7. The method of claim 1, wherein meeting the entry movement condition comprises one or more of:
the first buffer is full;
a concurrent query operation of an entry stored in the first buffer is required;
a concurrent update operation of the entry stored in the first buffer is required; and
a concurrent delete operation of the entry stored in the first buffer is required.

8. A computer program product comprising:
one or more computer readable storage media and program instructions stored on the one or more computer readable storage media, the program instructions comprising instructions to:
store entries associated with an index to a first buffer of at least two buffers allocated to the index;
move, by a batch operation, entries in the first buffer into an index page for the index in response to an entry movement condition being met; and
store new entries associated with the index to another buffer of the at least two buffers while moving the entries in the first buffer.

9. The computer program product of claim 8, wherein the at least two buffers each contain a given number of slots for storing the entries, which is determined based on a size of the at least two buffers and a total length of an entry.

10. The computer program product of claim 8, wherein an entry associated with the index is stored in a slot assigned to the entry and wherein a slot indication field is used to indicate a position of a last-inserted slot.

11. The computer program product of claim 8, wherein operations of storing entries, moving entries, and storing new entries are enabled for all indices in response to detection of sequential data insertion and disabled for all indices in response to detection of random data insertion.

12. The computer program product of claim 8, wherein the program instruction include instructions to monitor a frequency of one or more of concurrent query, delete, and update operations associated with the index, and disable operations of storing entries, moving entries, and storing new entries while a frequency is less than a predetermined frequency threshold.

13. The computer program product of claim 8, wherein the program instructions further comprise one or more of:
instructions to record an entry operation log in response to an entry operation occurring in any of the at least two buffers;
instructions to record a buffer externalization log in response to the entries being moved from any of the at least two buffers into the index page; and
instructions to record a page writing log in response to entries stored in any of the at least two buffers being moved to the index page successfully.

14. The computer program product of claim 8, wherein meeting the entry movement condition comprises one or more of:
the first buffer is full;
a concurrent query operation of an entry stored in the first buffer is required;
a concurrent update operation of the entry stored in the first buffer is required; and
a concurrent delete operation of the entry stored in the first buffer is required.

15. A computer system comprising:
one or more computer processors;
one or more computer readable storage media;
program instructions stored on the computer readable storage media for execution by at least one of the computer processors, the program instructions comprising instructions to:
store entries associated with an index to a first buffer of at least two buffers allocated to the index;
move, by a batch operation, entries in the first buffer into an index page for the index in response to an entry movement condition being met; and
store new entries associated with the index to another buffer of the at least two buffers while moving the entries in the first buffer.

16. The computer system of claim 15, wherein the at least two buffers each contain a given number of slots for storing the entries, which is determined based on a size of the at least two buffers and a total length of an entry.

17. The computer system of claim 15, wherein an entry associated with the index is stored in a slot assigned to the entry and wherein a slot indication field is used to indicate a position of a last-inserted slot.

18. The computer system of claim 15, wherein operations of storing entries, moving entries, and storing new entries are enabled for all indices in response to detection of sequential data insertion and disabled for all indices in response to detection of random data insertion.

19. The computer system of claim 15, wherein the program instruction include instructions to monitor a frequency of one or more of concurrent query, delete, and update operations associated with the index, and disable operations of storing entries, moving entries, and storing new entries while a frequency is less than a predetermined frequency threshold.

20. The computer system of claim 15, wherein the program instructions further comprise one or more of:
- instructions to record an entry operation log in response to an entry operation occurring in any of the at least two buffers;
- instructions to record a buffer externalization log in response to the entries being moved from any of the at least two buffers into the index page; and
- instructions to record a page writing log in response to the entries stored in any of the at least two buffers being moved to the index page successfully.

* * * * *